United States Patent [19]
Seki et al.

[11] Patent Number: 5,856,863
[45] Date of Patent: Jan. 5, 1999

[54] METHOD AND APPARATUS FOR FEEDING FILM CARTRIDGES

[75] Inventors: Kouji Seki; Toru Yoshikawa, both of Wakayama, Japan

[73] Assignee: Noritsu Koki Co., Ltd., Wakayama, Japan

[21] Appl. No.: 877,570

[22] Filed: Jun. 17, 1997

[30] Foreign Application Priority Data

Jun. 17, 1996 [JP] Japan .................................. 8-155228

[51] Int. Cl.⁶ ........................... G03B 27/52; G03B 27/62
[52] U.S. Cl. ................ 355/40; 355/75; 396/647; 396/599
[58] Field of Search ................... 355/40, 41, 72, 355/76, 75; 396/598, 612, 647, 599

[56] References Cited

U.S. PATENT DOCUMENTS

| | | | |
|---|---|---|---|
| 3,402,811 | 9/1968 | Nerwin | 209/598 |
| 4,186,837 | 2/1980 | Popiel et al. | 209/565 |
| 5,032,707 | 7/1991 | Gudmundson et al. | 355/40 |
| 5,231,439 | 7/1993 | Takahashi et al. | 396/600 |
| 5,473,402 | 12/1995 | Long et al. | 355/40 |
| 5,612,765 | 3/1997 | Yoshikawa | 355/72 |

OTHER PUBLICATIONS

Patent Abstracts of Japan, vol. 096, No. 010, 31 Oct. 1996 & JP 08 152704 A (Fuji Photo Film Co. Ltd.), 11 Jun. 1996, * Abstract; Fig. 4–8 *.

Patent Abstracts of Japan, vol. 096, No. 005, 30 Jun. 1995 & JP 07 036120 A (Noritsu Koki Co. Ltd.), 7 Feb. 1995, * Abstract, Fig. 1–8 *.

*Primary Examiner*—D. Rutledge
*Attorney, Agent, or Firm*—Wenderoth, Lind & Ponack, L.L.P.

[57] ABSTRACT

New type film cartridges are fed to a photoprint collecting station where photoprints are discharged from a photoprinting processor to improve work efficiency. The new type film cartridges are supplied into the photoprinting processor. After printing films therein, the cartridges are retrieved from the processor and fed to the print collecting station by a carrier connected to a discharge end of the processor. The film cartridges are collated at the print collecting station with the developed prints.

2 Claims, 13 Drawing Sheets

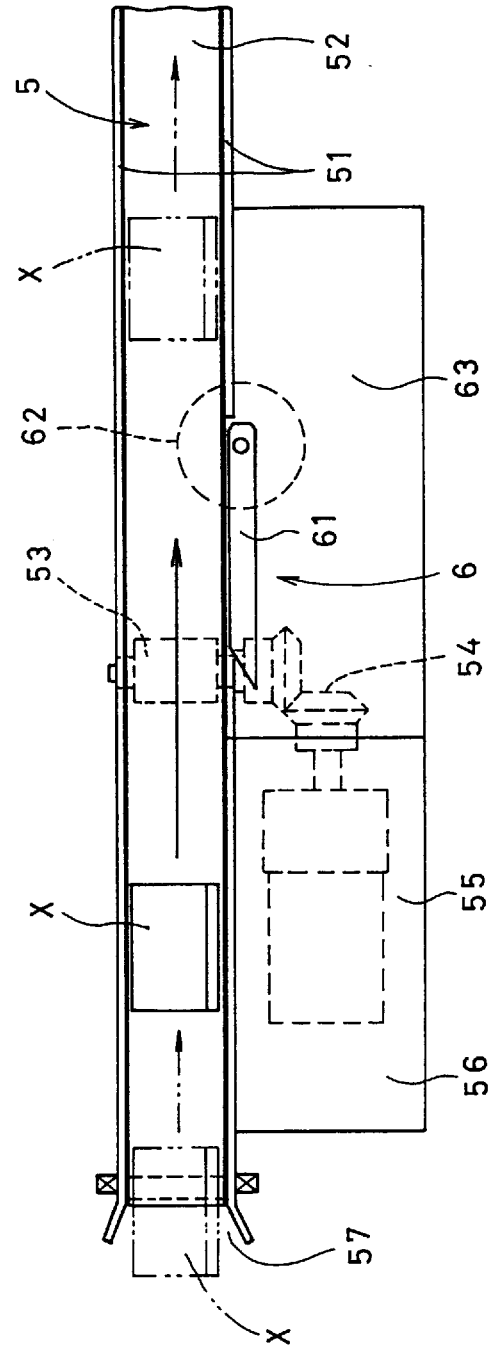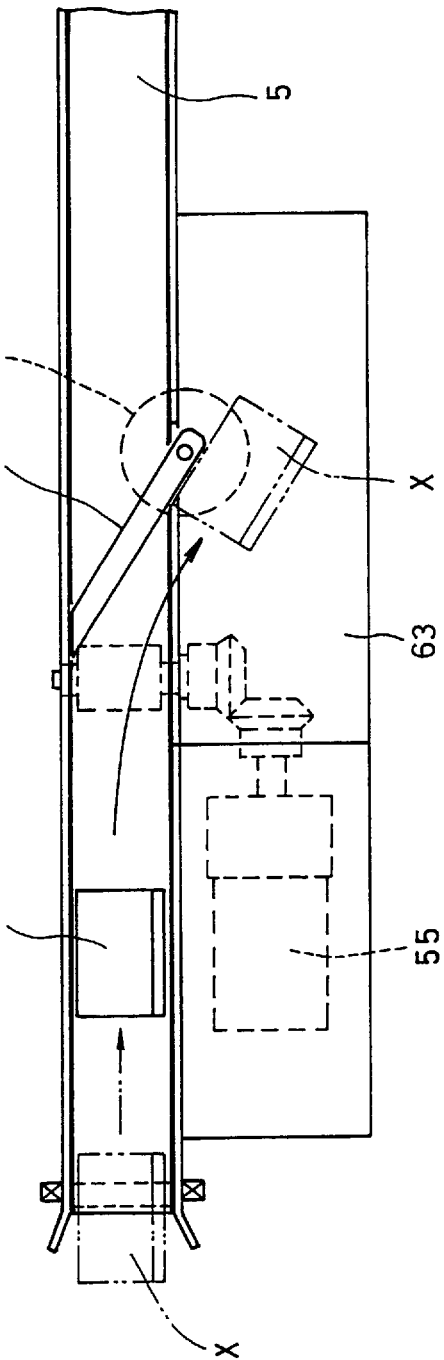

METHOD AND APPARATUS FOR FEEDING FILM CARTRIDGES

BACKGROUND OF THE INVENTION

This invention relates to a method and apparatus for feeding a new type of cartridges that make it possible to collate the film in each cartridge with corresponding photoprints at a print finishing station after the film in each cartridge has been processed in a photoprinter.

After being printed, a conventional 135 film, which is housed in a patrone, is cut to a plurality of strips each having six or so frames, put in a negative sheet and discharged for each customer at a position near a printing unit.

A sorter is used to feed prints to a position where an operator for finishing the prints is stationed. If it is necessary to finish the prints and collate the prints with corresponding cartridges, the operator has to carry negative sheets discharged at the printing unit to the position where prints are discharged.

Unexamined Japanese patent publication 7-36120 discloses a photoprinting processor for processing films stored in new type cartridges. This processor includes a rotary table mounted on a base. A plurality of cartridge holders are provided on the rotary table. A scanner unit and a print/exposure unit are provided across the rotary table from each other along a first line connecting two diametrically opposite cartridge holders when these two cartridges are at predetermined positions. A cartridge feed station is provided on the base along a second line perpendicular to the first line.

When any two diametrically opposite cartridge holders are moved into alignment with the scanner and print/exposure units, films in the cartridges held in these two holders are fed into the scanner and print/exposure units and then wound back into the respective cartridges.

To feed film into these units, the spool of the cartridge held by each holder is turned to feed a film end into a film guide. When the film end is caught between driving and pressure rollers provided in the film feed path, the film is fed by the rollers. When the film is completely pulled out of the cartridge, an end mark impressed on the film is detected. When the end mark is detected, the film is wound back into the cartridge.

When a film has been printed in the photoprinter, the film is wound back into the cartridge. The cartridge is then returned to the cartridge feed station and discharged. In this arrangement, too, an operator has to carry film cartridges to the print discharge station, as in the abovementioned earlier photoprinting method.

Films stored in new type cartridges can be fed into processors by setting cartridges one by one in the respective cartridge holders on the rotary table. But since new type cartridges have been developed so that they can be automatically fed into processors, it is desirable to feed them automatically from the cartridge storage space by a carrier.

But in the abovementioned conventional arrangement, an operator has to carry new type film cartridges to the print discharge station. Since many cartridges have to be manually moved one by one to the print discharge station, efficiency is extremely low.

An object of this invention is to provide a method and apparatus for feeding film cartridges in which film cartridges are transported to a print collecting station after they have been fed into and out of the photoprinter so that film cartridges can be collated with prints with high efficiency.

SUMMARY OF THE INVENTION

According to this invention, there is provided a method of feeding film cartridges comprising supplying a film cartridge into a photoprinting processor, printing a film in the cartridge in the processor, retrieving the cartridge from the processor, and feeding the cartridge to a print collecting station to collate the cartridge with developed prints.

In this method, a plurality of film cartridges stored in a storage space are supplied one by one into the photoprinting processor to print films therein. The cartridges supplied into the processor contain developed films. When film is rewound into a cartridge, the cartridge is moved back to its original position and then fed to the print collecting station, where it is collated with photoprints discharged from the photoprocessor to determine if their contents are identical.

According to the second invention, film cartridges are sorted into cartridges containing developed films and those containing undeveloped films by detecting whether or not each cartridge has a nail, and only the former cartridges are supplied into the photoprinting processor. All the cartridges containing undeveloped films are ejected from the feed path leading to the print collecting station. If a signal indicating clogging of print paper or a print stop signal is produced while a cartridge containing a developed film is being fed into or out of the photoprinting processor, such a cartridge is also ejected from the feed path leading to the print collecting station. The remaining film cartridges are fed to the print collecting station.

According to the invention, there is provided an apparatus for feeding film cartridges and comprising a cartridge supply/collect means for supplying film cartridges into a photoprinting processor and retrieving the film cartridges from the processor, a cartridge carrier means for feeding the film cartridges to a print collecting station to collate the film cartridges with developed prints, a detector means for distinguishing cartridges containing developed films from cartridges containing undeveloped films by detecting whether or not each cartridge has a nail, and a sorter means for sorting cartridges based on a signal from the detector means and a signal indicating clogging of print paper or a print stop signal.

This apparatus distinguishes cartridges containing developed films from those containing undeveloped films, and supplies only the former into the photoprinting processor to print films therein. During printing or while a film cartridges containing a developed film is being fed into the photoprinting processor, it may become necessary to stop printing operations due to clogging of print paper or some other machine difficulty.

Thus, not all the developed films fed into the photoprocessing printer are printed. According to the present invention, only the cartridges containing developed and printed films are fed to the print collecting station, while all the other cartridges are ejected from the feed path leading to the print collecting station.

Other features and objects of the present invention will become apparent from the following description made with reference to the accompanying drawings, in which:

BRIEF DESCRIPTION OF THE DRAWINGS

FIGS. 3A and 3B are plan views of the carrier;

DETAILED DESCRIPTION OF THE PREFERRED EMBODIMENT

An embodiment of this invention will now be described with reference to the accompanying drawings.

Figure 1:
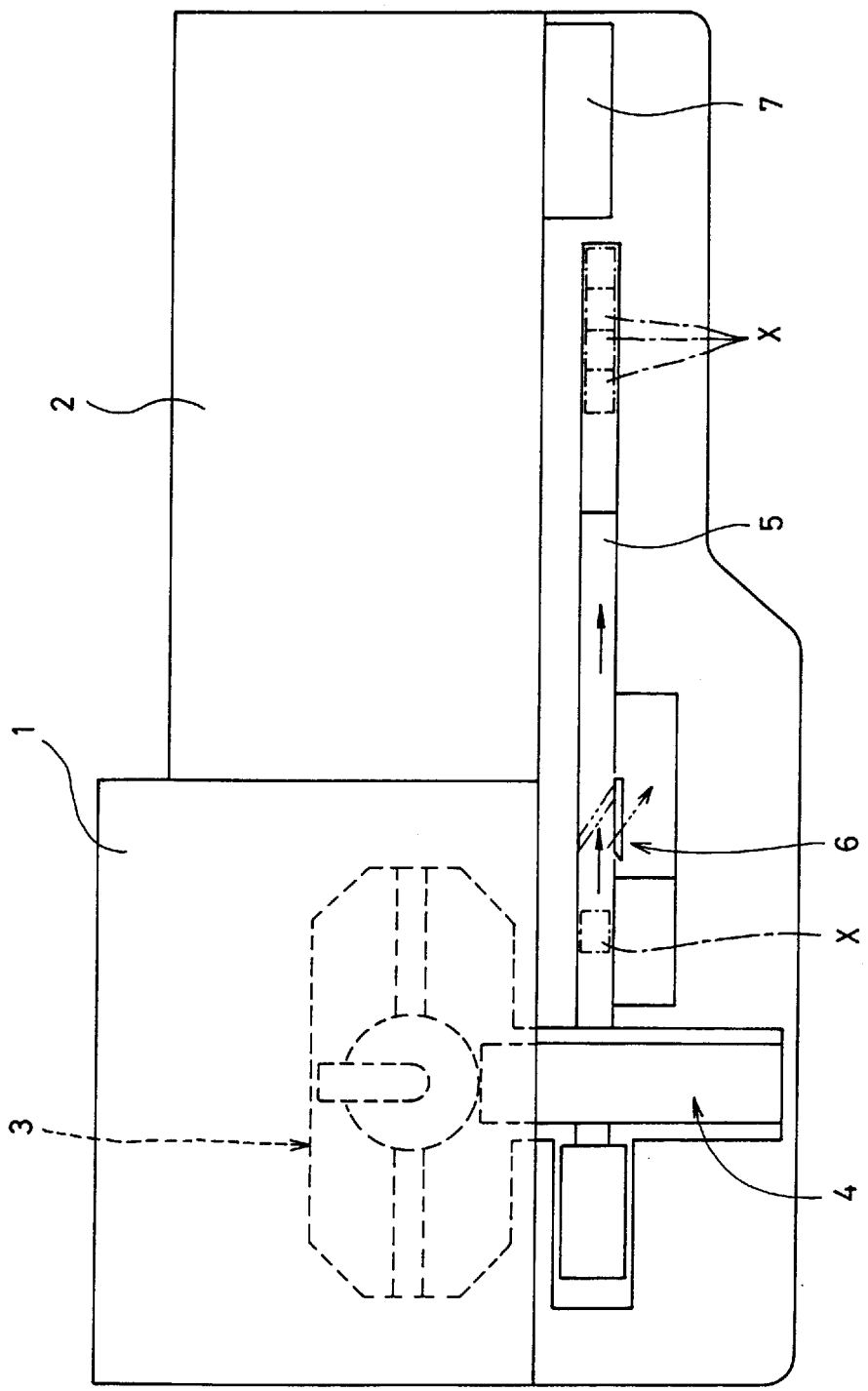
FIG. 1 is a schematic plan view of a photoprinting processor.

FIG. 1 is a plan view of an entire photoprocessor with a carrier according to the present invention. The photoprocesser comprises a photo-developing unit 1, a photo-finisher 2 and a photoprinter 3. The photoprinter 3 is a rotary table type as disclosed in the aforementioned patent publication and is used exclusively to print films in new type film cartridges.

A cartridge feeder/collector 4 feeds film cartridges X into the photoprinter 3 for printing, collects them out of the printer 3 after printing, and sends them onto a carrier 5 through a discharge opening. A cartridge sorter 6 is provided on the carrier 5 to sort cartridges X containing undeveloped film. The carrier 5 extends to a point just short of a print collector 7 of the photo-finisher 2.

Figure 2:
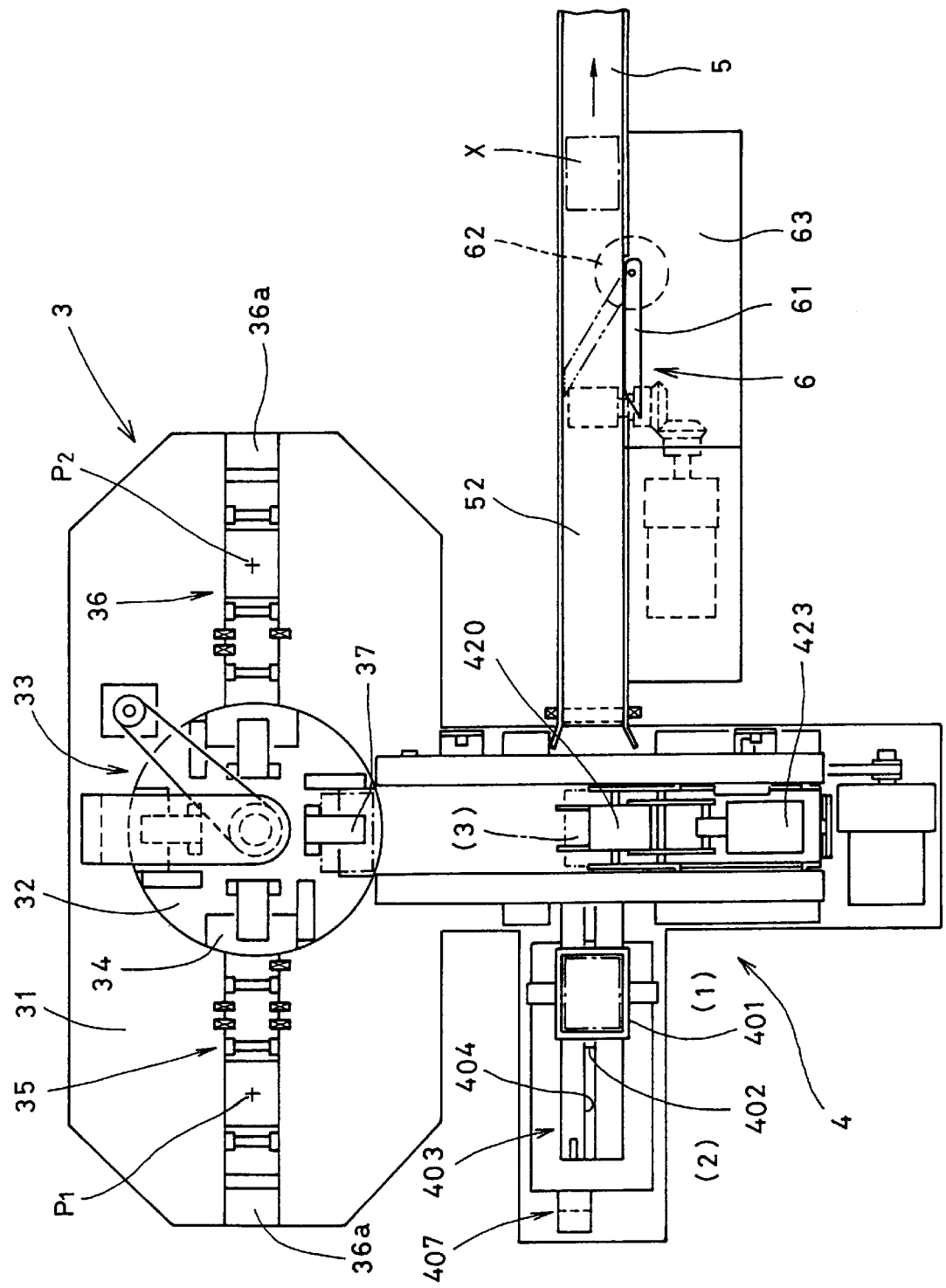
FIG. 2 is a schematic plan view of a photoprinting processor having a carrier.

As seen in FIG. 2, the photoprinter 3 has a base 31 on which is rotatably supported a rotary table 32. The rotary table is rotated by a drive unit 33 comprising a rotary shaft supported by a support frame, and a motor for rotating the rotary shaft through a belt. Four cartridge holders 34 are mounted on the rotary table 32 at 90° intervals. A scanning station 35 and a print/exposure station 36 are provided around the rotary table 32, diametrically opposite to each other with respect to the center of the rotary table. Thus, by rotating the rotary table 32, each of the two diametrically opposed pairs of holders 34 are alternately brought into alignment with the units 35 and 36.

Provided in the scanning station 35 are a pair of scanner units (not shown) located over and under a centerline that passes a point P1 on the feed path of film fed out of a cartridge set in one cartridge holder 34 when it aligns with the scanning station. Film is wound into a film winder 36a. The print/exposure station 36 is basically identical in structure to the scanning station, having a pair of print/exposure units (not shown) provided over and under a point P2. Further details of the photoprinter 3 are omitted because they are disclosed in the aforementioned publication.

As shown in FIGS. 3A–3B, the carrier 5 includes an endless belt conveyor 52 provided between side frames 51 and driven between front and rear rollers (not shown) by a motor 55 through a gear 54 and an intermediate roller 53. Numeral 56 indicates a cover case. Feed end 57 of the carrier 5 is funnelled so that cartridges X can be fed smoothly into the carrier.

Figure 9:
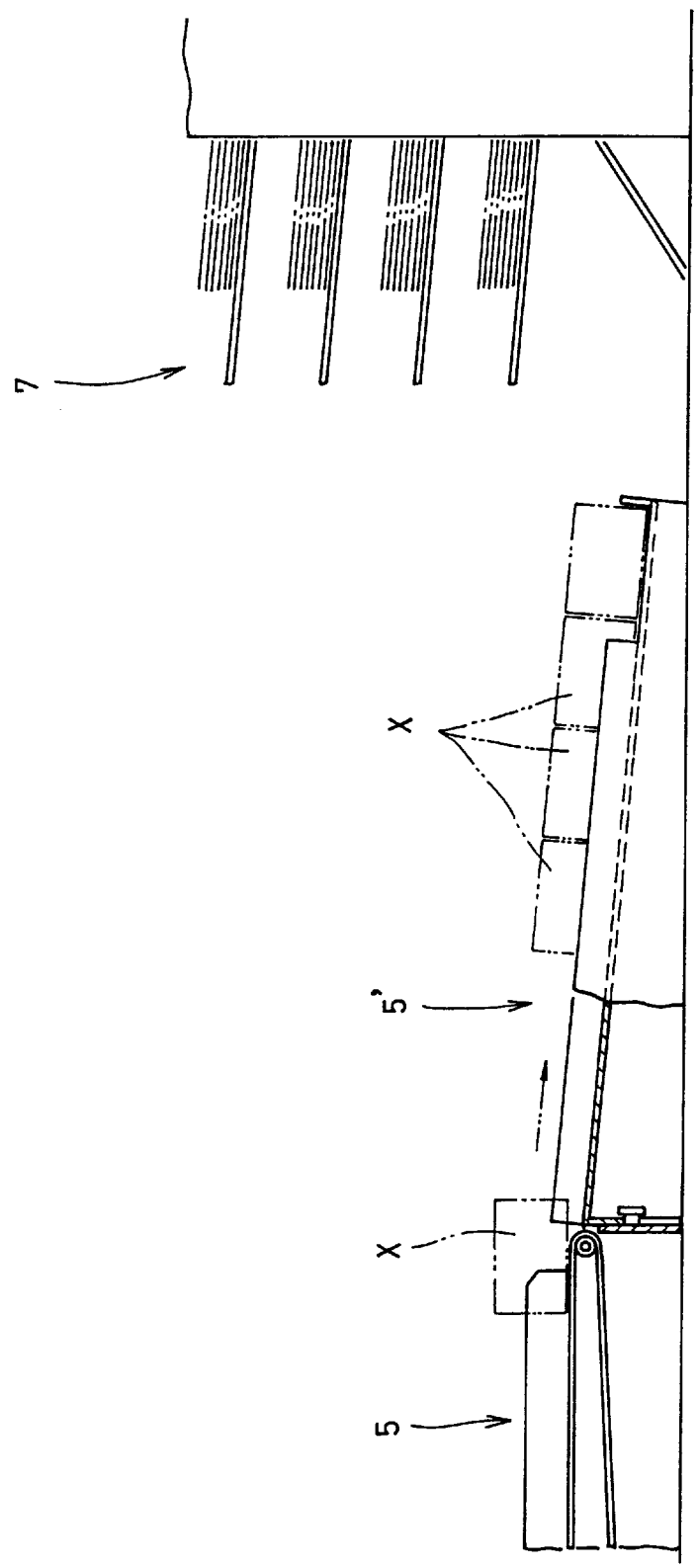
FIG. 9 is a side view of a stock path.

At its delivery end, the carrier 5 has a slightly inclined stock path 5' as shown in FIG. 9. The end of the stock path 5' is located adjacent the print collector 7.

The sorter 6, provided at an intermediate portion of the carrier 5, comprises a sorting lever 61 and a solenoid 62 for pivoting the lever 61. When the cartridge feed path is blocked by the lever 61 as shown in FIG. 3B, cartridges X are diverted from the feed path into an apron stage 63.

Figure 4:
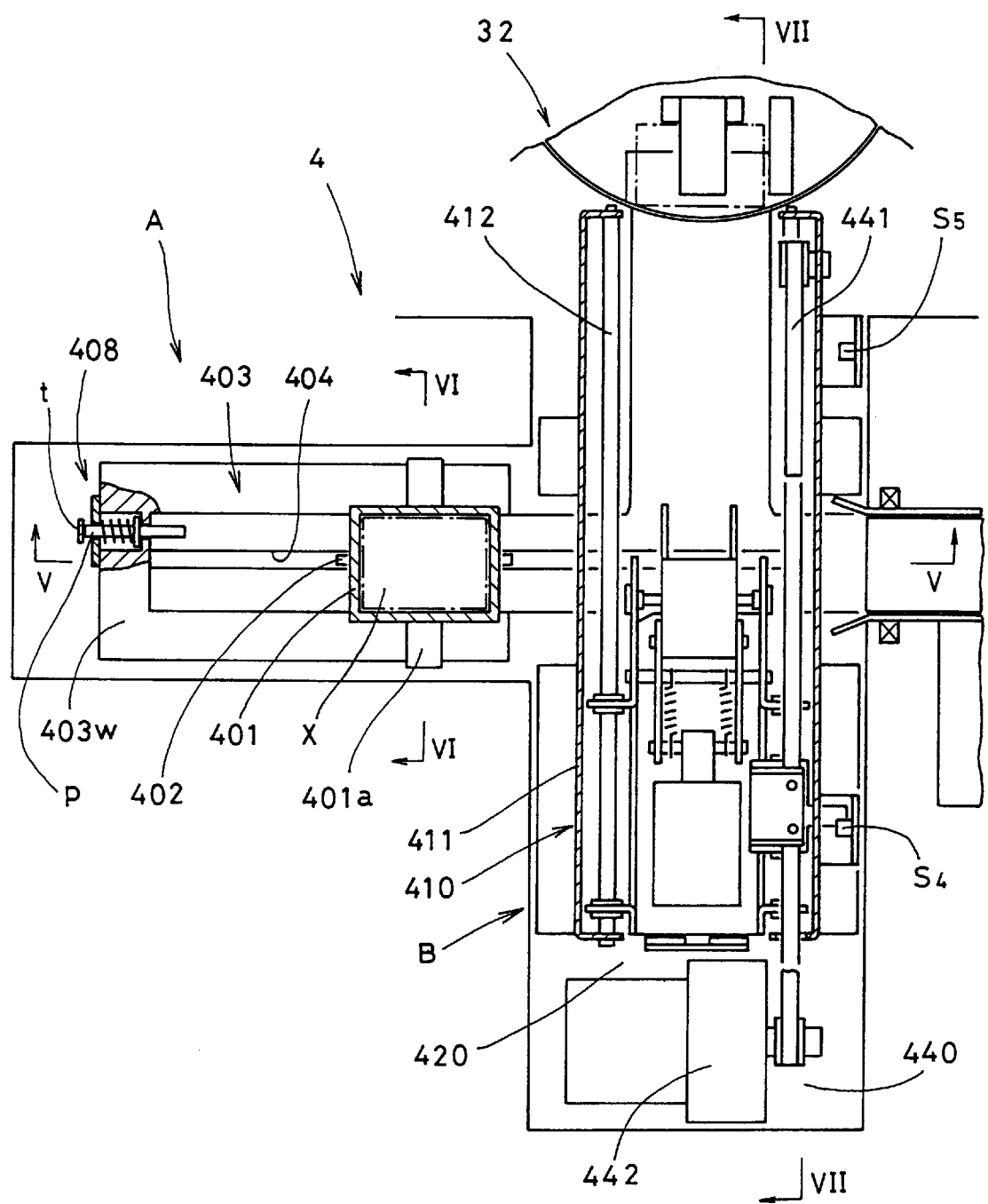
FIG. 4 is an enlarged plan view of a cartridge supply/collecting means.
Figure 5:
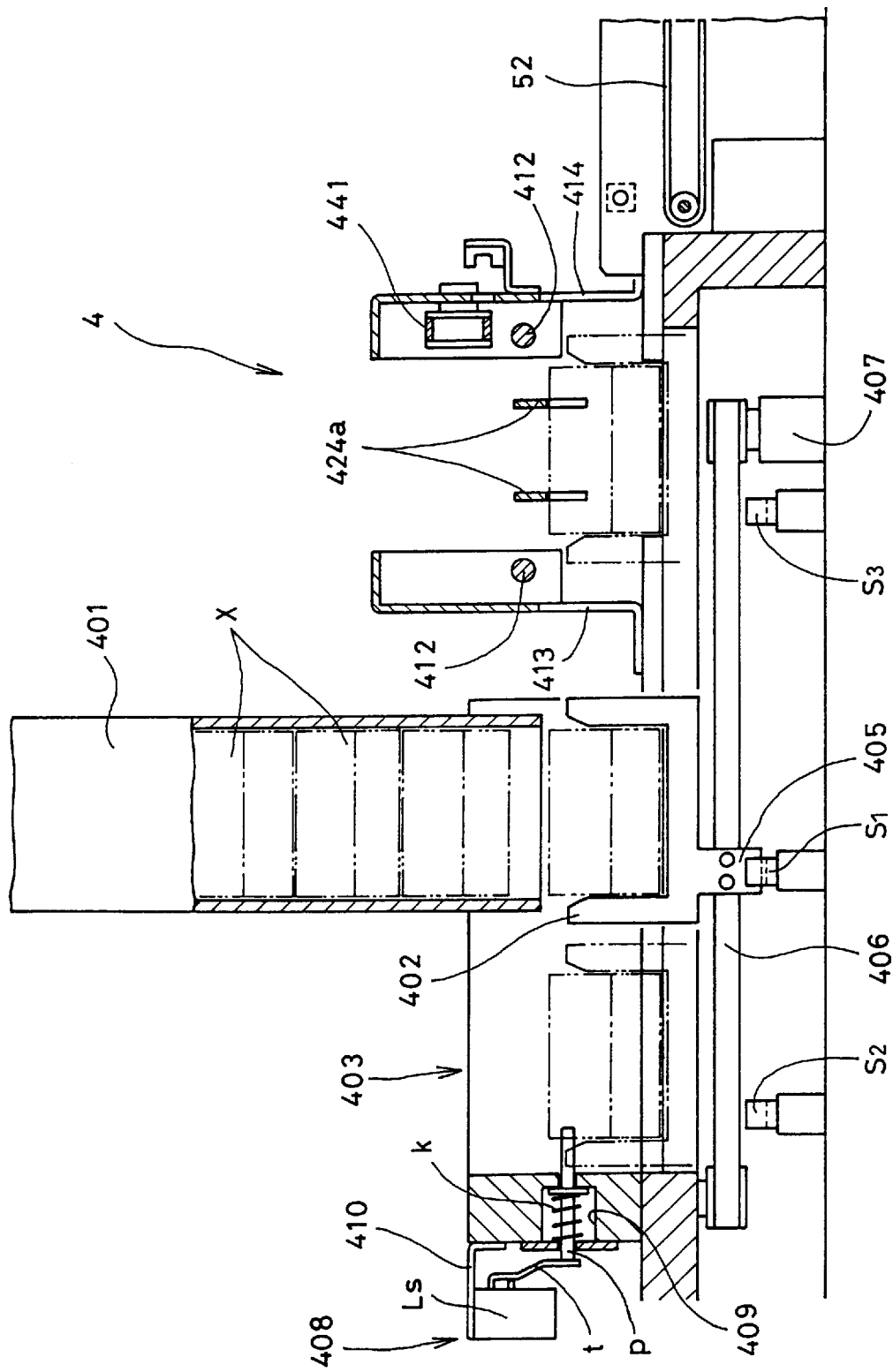
FIG. 5 is a sectional view taken along line V—V of FIG. 4.

The cartridge feeder/collector 4 is shown schematically in FIG. 2 and in detail in FIGS. 4–8. Numerals (1)–(3) in FIG. 2 indicate different positions of cartridges being fed. The feeder/collector 4 comprises a cartridge storage/feed unit A and a longitudinal feed unit B. As shown in FIGS. 4 and 5, the cartridge storage/feed unit A comprises a cartridge stocker 401 for dropping cartridges one at a time, and a cartridge receiver 402 laterally movable in a lateral feed unit 403 for receiving cartridges dropped from the stocker 401.

Figure 6:
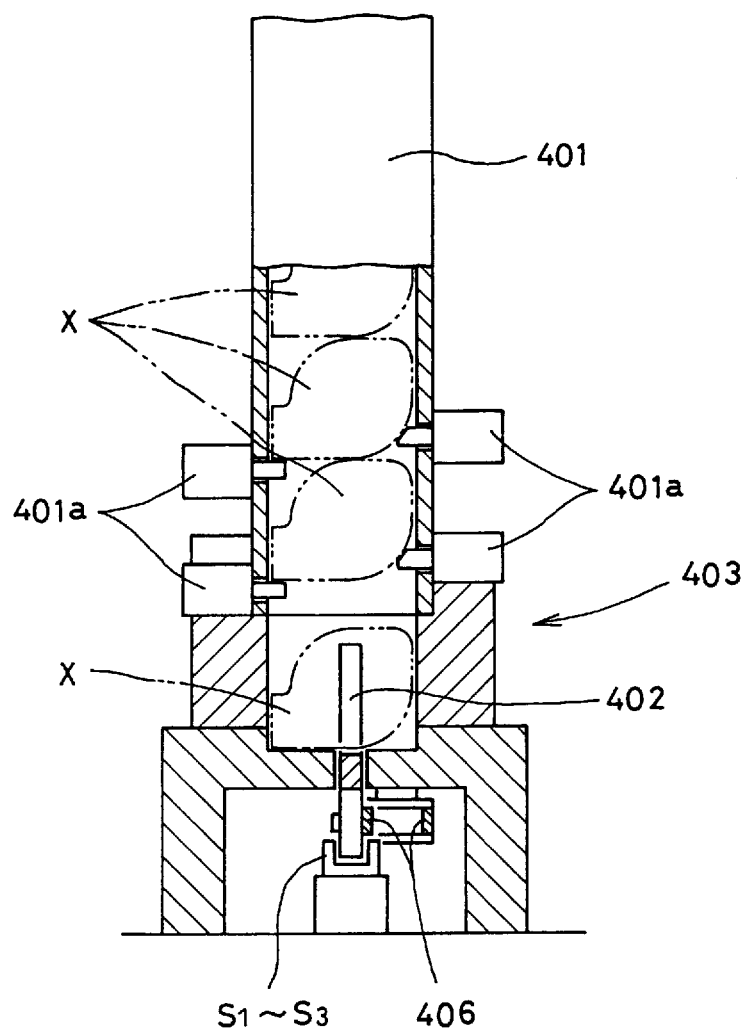
FIG. 6 is a sectional view taken along line VI—VI of FIG. 4.

The stocker 401 comprises, as shown in FIG. 6, a cartridge stocking cylinder in which a plurality of cartridges are stored one atop another, and two opposed pairs of solenoids 401a provided at the bottom end of the cylinder. By opening the lower pair of solenoids 401a with the upper pair closed, the lowest one of the cartridges in the cylinder drops. Then, the upper pair of solenoids are opened with the lower pair closed to drop the cartridges to fill the space between the upper and lower solenoids.

As shown in FIGS. 4 and 5, the cartridge receiver 402 is a U-shaped member movable laterally in a gap 404 defined in the lateral feed unit 403. An endless belt 406 is connected to a protrusion 405 provided at the bottom end of the cartridge receiver 402. By turning one of two pulleys supporting the belt 406 in either direction with a motor 407, the cartridge receiver 402 is moved laterally. S1, S2 and S3 are position detection sensors for detecting that the cartridge receiver 402 is in respective positions.

The lateral feed unit 403 has a base at substantially the same height as the cartridge receiving surface of the cartridge receiver 402. Its end wall 403w (FIG. 4) has an IPI detection sensor 408 for determining whether the film in each cartridge X is developed or undeveloped by detecting whether or not the cartridge X has a nail d (to be described hereinbelow) (hereinafter "IPI detection").

The detection sensor 408 determines that a cartridge has a nail if a lever t of a limit switch Ls (FIG. 5) is bent by being brought into contact with a pin p, and otherwise determines that there is no nail. The pin p and a spring k are received in a recess 409, while the limit switch LS is mounted on a support plate of the end wall 403w.

Figure 7:
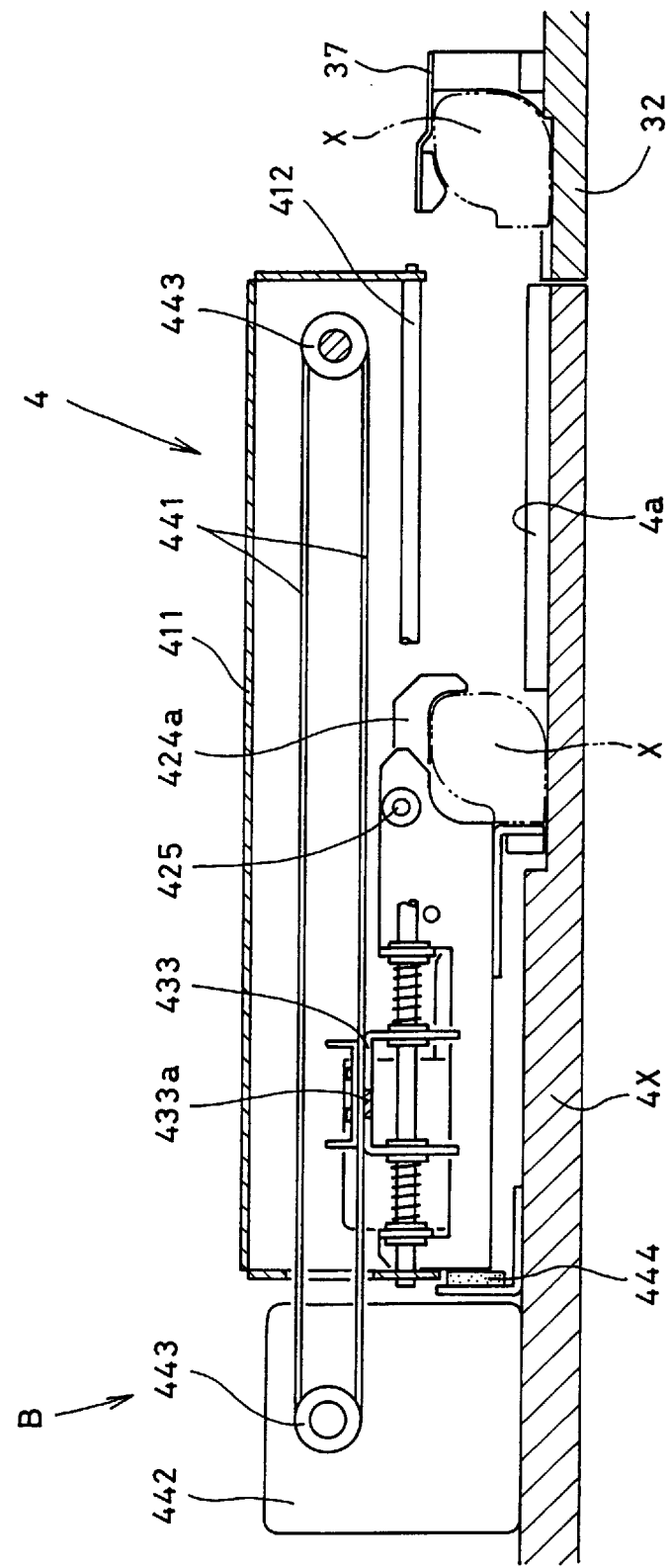
FIG. 7 is a sectional view taken along line VII—VII of FIG. 4.

Referring to FIGS. 4 and 7, the longitudinal feed unit B comprises feed guide 410, a carriage 420 movable along the guide 410, and a drive unit 440 for driving the carriage 420. The feed guide 410 comprises two parallel side walls 411 and guide rods 412 provided between the side walls 411 and extending into between the drive unit 440 and the rotary table 32 of the photoprinter 3.

Figure 8:
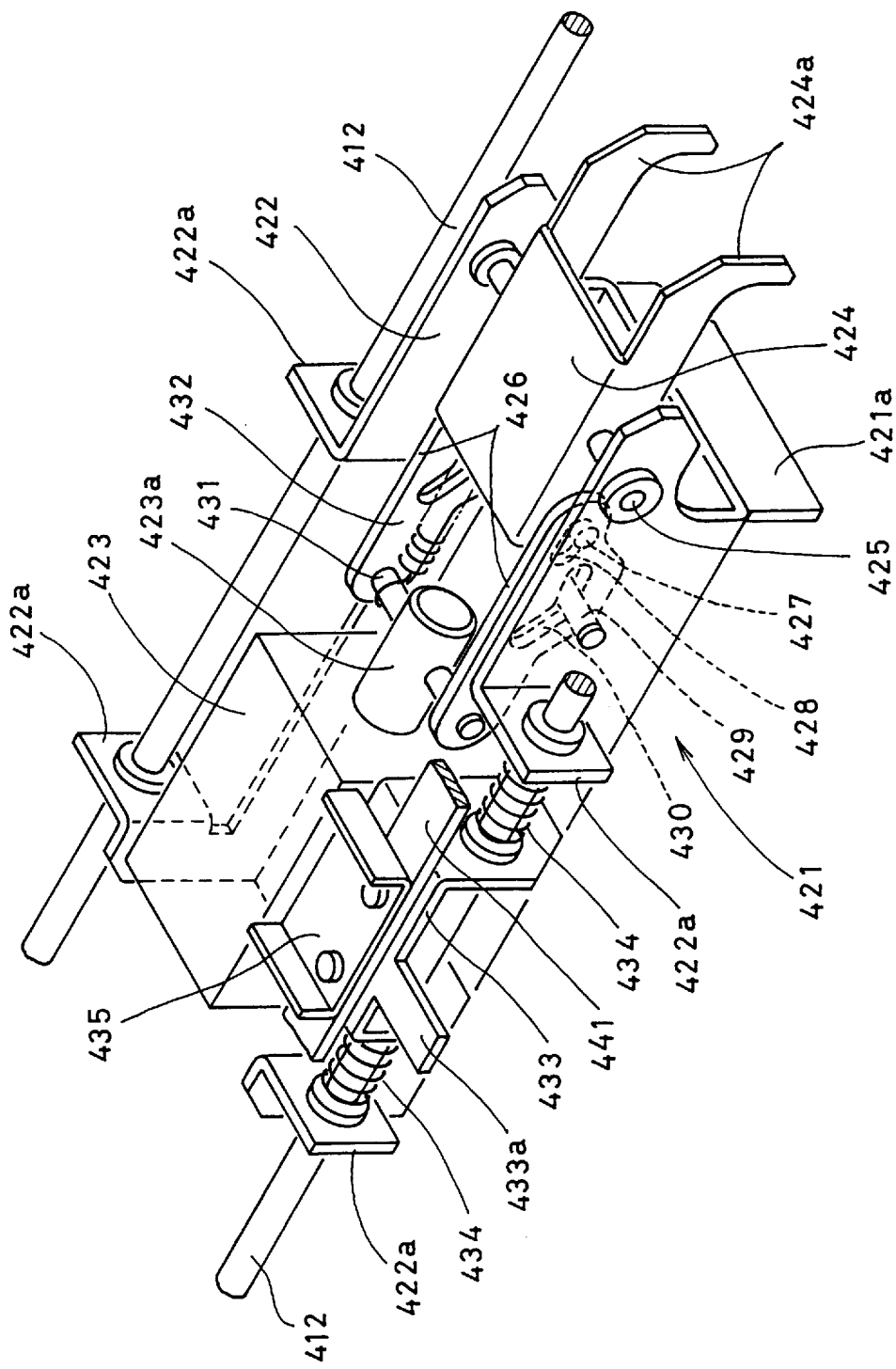
FIG. 8 is an enlarged perspective view of a carriage.

Turning now to FIG. 8, the carriage 420 comprises a base 421, support plates 422 provided on the four corners of the base 421 and partially protruding outwardly, and four support arms 422a slidably engaging the guide rods 412. The base 421 carries a solenoid 423 and a cartridge holder 424 having fork levers 424a at its front end.

The cartridge holder 424 is pivotable about a pin 425 supported on the support plates 422, and coupled to attitude control plates 426 on both sides by a pin 427 engaged in elongated holes 428. The attitude control plates 426 are formed with chevron-shaped second elongated holes 430 in which is inserted support pins 429 fixed to the support plates 422. The plates 426 are thus movable.

Ends of the attitude control plates 426 are coupled together by a rod 431. A spring 432 provided between the support pin 429 and the rod 431 resiliently couples the holder 424 to the solenoid 423. As shown, the solenoid 423 has its solenoid rod 423a fixed to the rod 431 and thus coupled to the holder 424.

A U-shaped coupling member 433 is provided between two support arms 422a on one side so as to be slidable along the guide rod 412. Springs 434 are mounted around the rod 412 between the coupling member 433 and the support arms 422a, restricting the sliding movement of the member 433 along the rod 412.

To the top of the coupling member 433, a belt 441 of drive unit 440, to be described hereinbelow, is fastened by a fastening means 435. Numeral 433a is a detection plate for a position detection sensor provided at one end of the coupling member 433. As shown in FIG. 4, position detection sensors S4 and S5 are provided near both ends of the longitudinal feed path.

The drive unit 440 comprises, as seen in FIGS. 4 and 7, an endless belt 441 and a motor 442 for driving the belt. The endless belt 441 is supported by a motor-driven pulley 443 and a pulley 443 provided near the end of the longitudinal feed path. Numeral 444 is a stopper. The longitudinal feed path is formed on a base plate 4x and includes a guide path 4a for smoothly feeding cartridges X from the lateral feed unit 403 onto the longitudinal feed path. Numeral 37 is a cartridge engaging means provided on the rotary table.

Figure 13A:
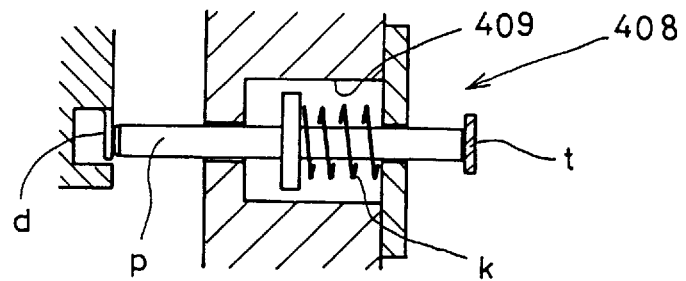
FIGS. 13A–13C are views showing how a nail of each cartridge is detected, and a cartridge.
Figure 13B:
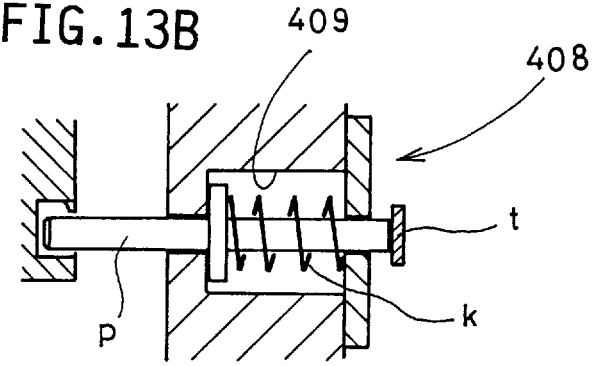
Figure 13C:
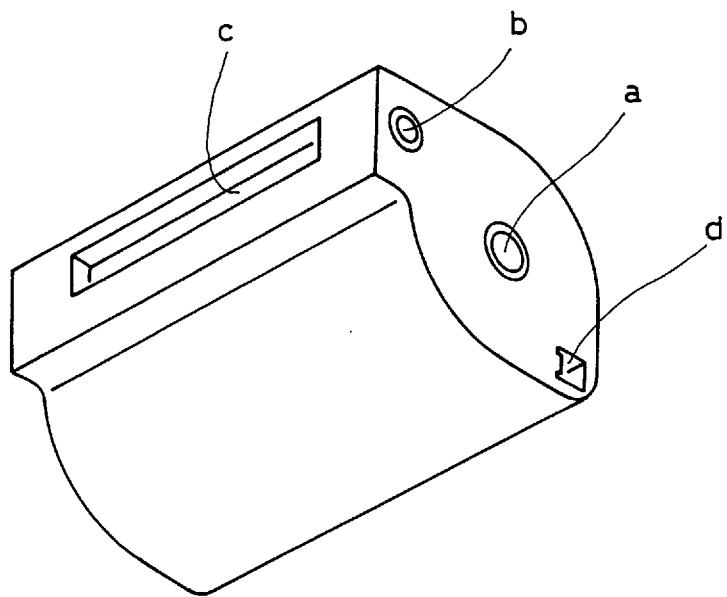

Cartridges X used are new type ones as shown in FIG. 13C. Such new type cartridge is small but can entirely house a roll of film therein and includes a spool shaft a, a rotary shaft b for opening and closing a door c, and a nail d. Depending on whether or not there a nail is present, it is determined whether the film in the cartridge has been developed or not.

If the cartridge has the nail as shown in FIG. 13A, the nail pushes the pin p of the nail detection sensor 408 against the force of the spring k. The sensor thus detects that the film in the cartridge has not yet been developed. If the cartridge has no nail as shown in FIG. 13B, the pin p fits in a recess of the cartridge. The sensor thus detects that the film has been developed.

Now the operation of this embodiment is described.

Figure 10A:
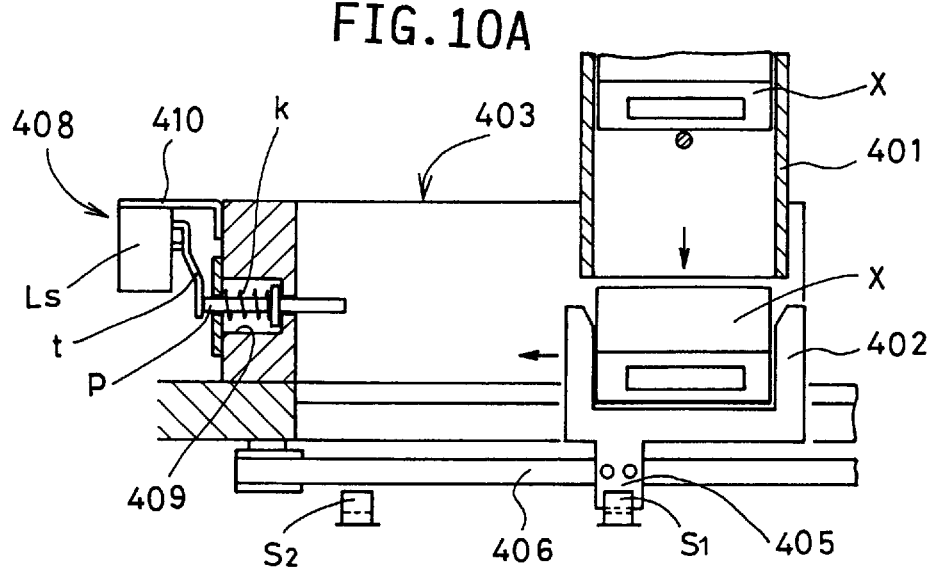
FIGS. 10A–10C are views showing the operation of a lateral feed unit.
Figure 10B:
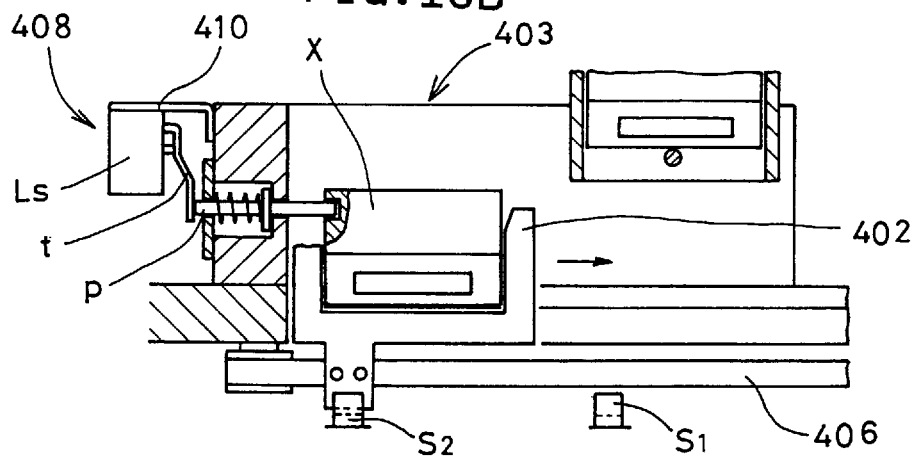
Figure 10C:
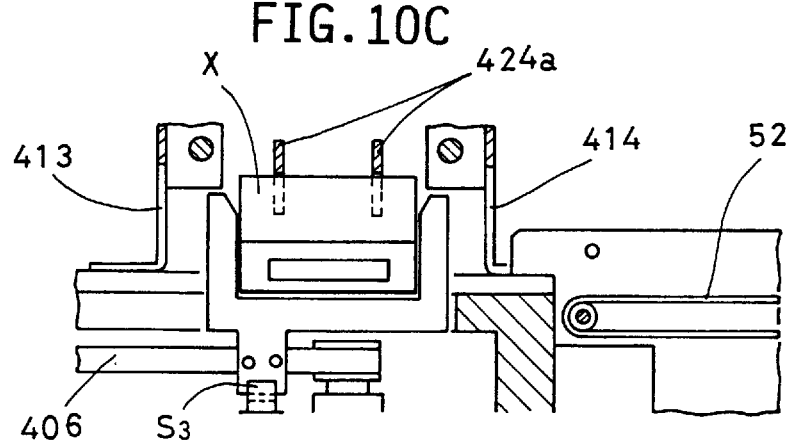

FIGS. 10A–10C shows cartridges X being fed laterally. In FIG. 10A, one cartridge X is dropped from the cartridge stocker 401, received in the cartridge receiver 402 and fed laterally, i.e. leftwardly so that the nail detection sensor 408 provided on the end wall can detect whether or not the cartridge has a nail.

Thereafter, the cartridge is fed longitudinally in two different ways depending on whether or not the cartridge has the nail or not. We will explain how different in the.

In the state of FIG. 10B, the cartridge receiver 402 is at a stop near the end wall. The pin p of the nail detection sensor 408 detects whether or not the cartridge has the nail. In the case shown, the cartridge has no nail, which means that the film in the cartridge has been developed. From this state, the cartridge is moved back in the direction of the arrow past the feed position shown in FIG. 10A until the cartridge receiver 402 enters the longitudinal feed path.

In FIG. 10C, the cartridge X is caught by fork levers 424a of the cartridge holder 424 of the carriage 420 in the longitudinal feed path, is fed longitudinally. The cartridge X can move either leftwardly or rightwardly of either side wall 411 through either of openings 413, 414 formed in the side walls 411.

Figure 11A:
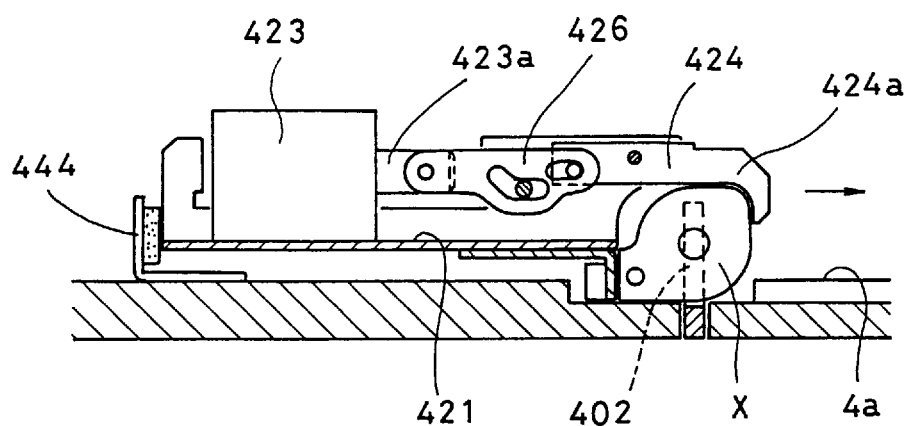
FIGS. 11A and 11B are views showing how cartridges are fed longitudinally by the carriage.

When the cartridge X is fed into the carriage 420 as shown in FIG. 11A, the solenoid 423 is activated to pull the holder 424 until the cartridge X is held between the fork levers 424a and the apron 421a of the carriage 420. The cartridge X can now be fed longitudinally.

Figure 11B:
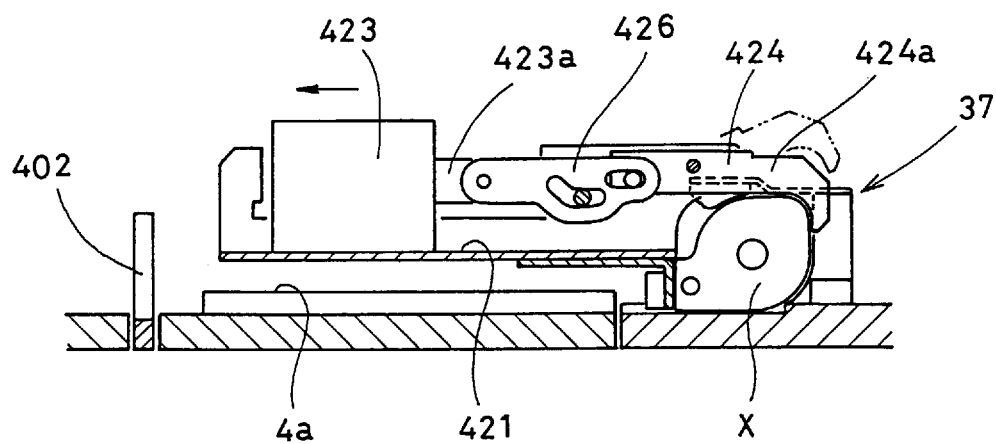

In this state, the motor 442 of the drive unit 440 is started to move the endless belt 441 and advance the carriage 420 (in the direction of the arrow (a)). In FIG. 11B, the cartridge X is engaged by the cartridge engaging means 37 on the rotary table 32.

As described earlier, if the nail detection sensor 408 has detected that the cartridge has no nail, the solenoid 423 is activated to protrude the rod 423a, raise the fork levers 424a and open the cartridge X (as shown by the two-dot lines). If the cartridge has the nail, the carriage 420 moves back with the fork levers 424a kept shut. That is, the cartridge is returned to the original position in the longitudinal feed path while being held by the carriage 420.

When the cartridge X is opened by raising the fork levers 424a, it is fed into the scanner and then print/exposure stations while being held by the cartridge engaging means 37, as the rotary table 32 is turned. After photoprinting/ exposure, the cartridge returns to the position shown in FIG. 11B.

When the cartridge X returns to the position shown in FIG. 11B, it is held by fork levers 424a and returned to the original position in the longitudinal feed path, in the same manner as when the cartridge has the nail.

Figure 12A:
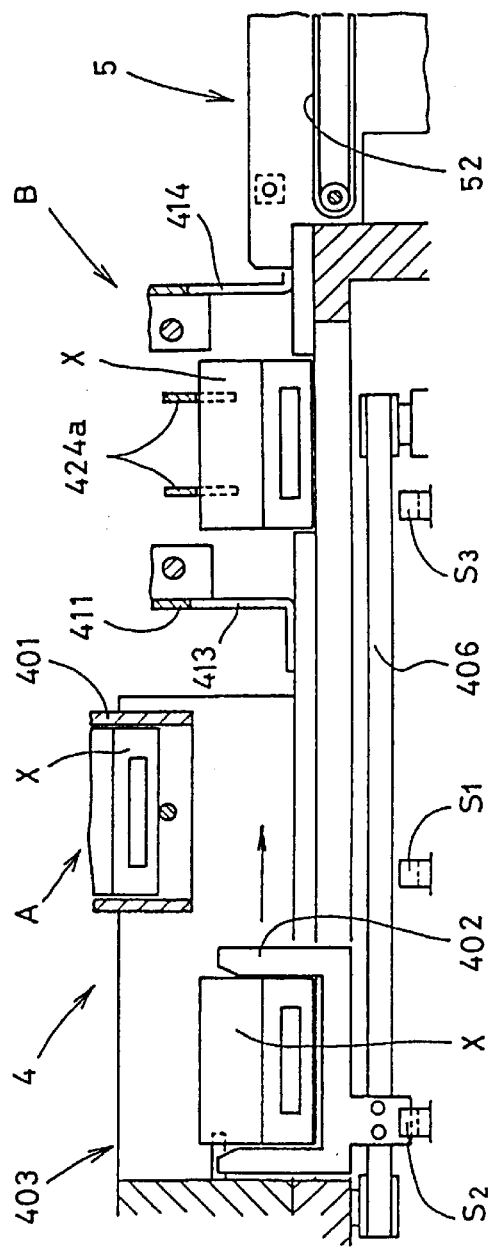
FIGS. 12A and 12B are veiws showing how cartridges are discharged by a cartridge receiver.
Figure 12B:
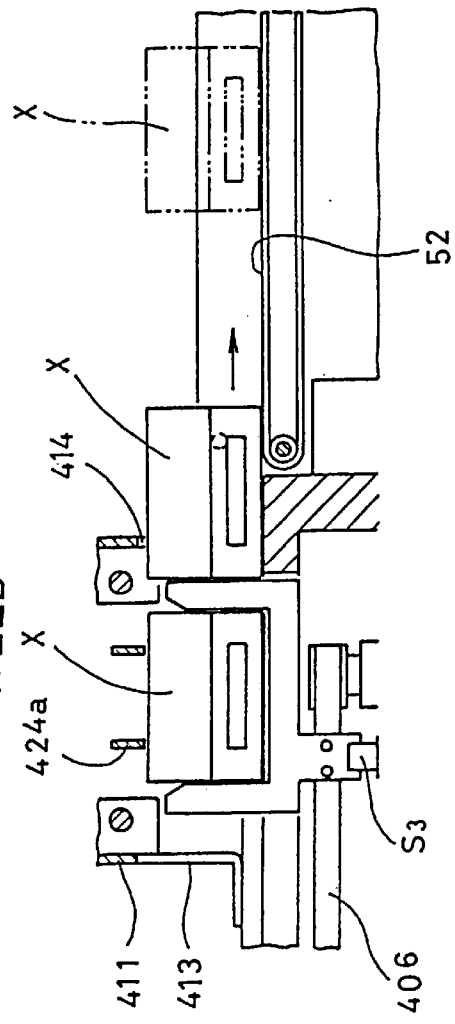

By the time the cartridge X returns to the original position, the next cartridge is received in the cartridge receiver 402 as shown in FIG. 12A. From this state, the cartridge receiver 402 approaches the cartridge X that has returned to the original position, and pushes it rightwardly as shown in FIG. 12B.

When this cartridge X has been completely pushed out rightwardly, it is received on the endless belt 52 of the carrier 5 and fed thereon. Simultaneously, the next cartridge X, received in the cartridge receiver 402, is fed in the longitudinal feed path.

Cartridges X are fed by the cartridge carrier 5 in the same manner as described above. The cartridge sorter 6 directs each cartridge into one of the abovementioned two feed paths according to the signal that indicates that the cartridge has a nail or no nail, a signal indicating clogging of print paper, or a print stop signal. Any cartridge having no nail, i.e. containing developed and printed film passes the sorter 6, and is fed downstream of the cartridge carrier 5. Thus, many cartridges X are stocked in stock path 5' (see FIG. 9). The cartridge X at the extreme end of the path 5' is compared with the print for each order, which is discharged by the print collector 7, and if they tally, this cartridge is delivered to a customer. By repeating this operation, cartridges are delivered one by one to customers.

For any cartridge having a nail, i.e. containing undeveloped film, the lever 61 of the sorter 6 is activated to block the path of the cartridge X and thus to discharge it into the apron stage 63.

It has been explained so far that the sorter 6 directs each cartridge to one of the two feed paths depending upon whether the cartridge contains a developed or an undeveloped film, which is determined based on whether or not the cartridge has a nail. But the following signals are also used to control the sorter. That is, if a print stop signal is produced or input due to clogging of print paper or any other trouble while a cartridge having no nail, i.e. containing developed film, is being fed into the photoprinter 3 or being printed in the photoprinter 3, the print is incomplete and it is not necessary to compare the print with the film in the cartridge.

Thus, in such a case, the sorter 6 is activated to discharge the cartridge into the apron stage.

Film cartridges are supplied into the photoprinting processor to print films therein. After printing, the cartridges are retrieved from the processor and sent to the print collecting station. With this arrangement, it is possible to directly compare the cartridges with photoprints and thus to improve efficiency of photoprinting.

Only cartridges containing developed and printed films are fed to the print collecting station, while cartridges containing undeveloped films and cartridges containing films that are developed but not printed because the processor has stopped due to clogging of print paper or other machine difficulties are ejected from the feed path leading to the print collecting station. Since only cartridges containing developed and printed films are fed to the print collecting station, efficiency is improved still further.

What is claimed is:

1. A method of feeding a plurality of film cartridges each having therein a film, said method comprising:

sorting said plurality of film cartridges into first cartridges containing developed film and second cartridges containing undeveloped film by detecting whether or not each said cartridge has a nail;

feeding said first cartridges into a photoprinting processor and therein printing said films in said first cartridges;

retrieving said first cartridges from said processor;

feeding said first cartridges and said second cartridges along a cartridge feed path leading to a print collecting station;

ejecting from said cartridge feed path said second cartridges and any of said first cartridges being fed therealong or being retrieved from said processor upon issuance of a signal indicative of clogging of print paper or a print stop signal; and feeding said first cartridges other than said any of said first cartridges to said print collecting station for collation with developed prints.

2. An apparatus for feeding film cartridges, said apparatus comprising:

a cartridge supply/collect means for supplying film cartridges into a photoprinting processor and retrieving the film cartridges from the processor;

a cartridge carrier means for feeding the film cartridges to a print collecting station to collate the film cartridges with developed prints;

a detector means for distinguishing cartridges containing developed films from cartridges containing undeveloped films by detecting whether or not each cartridge has a nail; and a sorter means for sorting cartridges based on a signal from said detector means and a signal indicative of clogging of print paper or a print stop signal.

* * * * *